United States Patent [19]
Barkan et al.

[11] Patent Number: 5,107,122
[45] Date of Patent: Apr. 21, 1992

[54] SPARSE READOUT METHOD AND APPARATUS FOR A PIXEL ARRAY

[75] Inventors: Ozdal I. Barkan, Carlsbad; Ghassan Y. Yacoub, LaCosta; Gordon Kramer, Huntington Beach, all of Calif.

[73] Assignee: Hughes Aircraft Company, Los Angeles, Calif.

[21] Appl. No.: 596,254

[22] Filed: Oct. 12, 1990

[51] Int. Cl.$^5$ .................... H01L 31/18; H04N 5/335
[52] U.S. Cl. ................... 250/370.01; 250/370.10; 358/213.6
[58] Field of Search ............. 250/370.01, 370.08, 250/370.10; 358/209, 213.26

[56] References Cited

U.S. PATENT DOCUMENTS

| | | | |
|---|---|---|---|
| 4,698,515 | 10/1987 | Sefai | 358/213.26 |
| 4,755,681 | 7/1988 | Oka et al. | 250/370.01 |
| 4,799,108 | 1/1989 | Gerner | 358/213.26 |
| 4,891,522 | 1/1990 | Coon et al. | 250/370.10 |
| 4,942,473 | 7/1990 | Zeevi et al. | 358/209 |
| 4,948,977 | 8/1990 | Mulder | 250/370.01 |

Primary Examiner—Jack I. Berman
Assistant Examiner—Richard Hanig
Attorney, Agent, or Firm—W. C. Schubert; W. K. Denson-Low

[57] ABSTRACT

Information is obtained from the pixels of a spatial pixel array, such as a sub-atomic particle detector array, by discriminating between pixels that have and have not received actuating inputs, and obtaining outputs only from selected pixels. These pixels are determined by the pixels which have received actuating inputs, and may consist of the hit pixels and their immediate neighbors. The system monitors for the occurrence of an event of interest that occurs over time substantially less frequently than the rate at which actuating inputs are supplied to the pixel array, and obtains outputs from the selected pixels only for the times that correspond to the occurrence of an event of interest. The amount of data to be processed is thus substantially reduced.

25 Claims, 7 Drawing Sheets

FIG. 1.
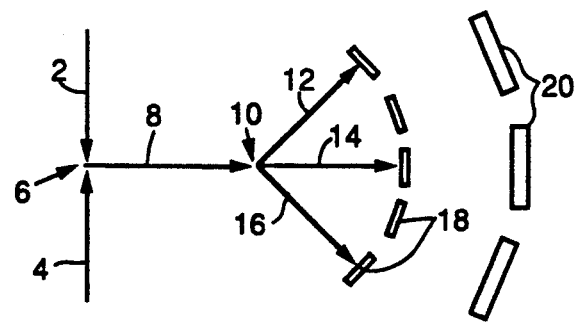
FIG. 2.
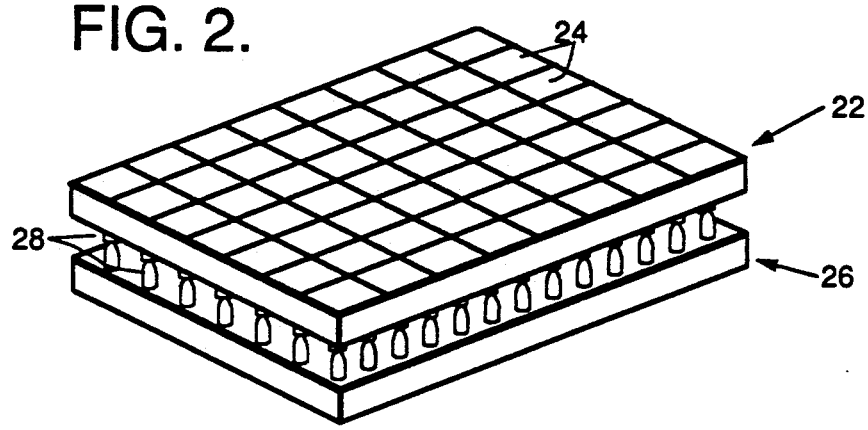
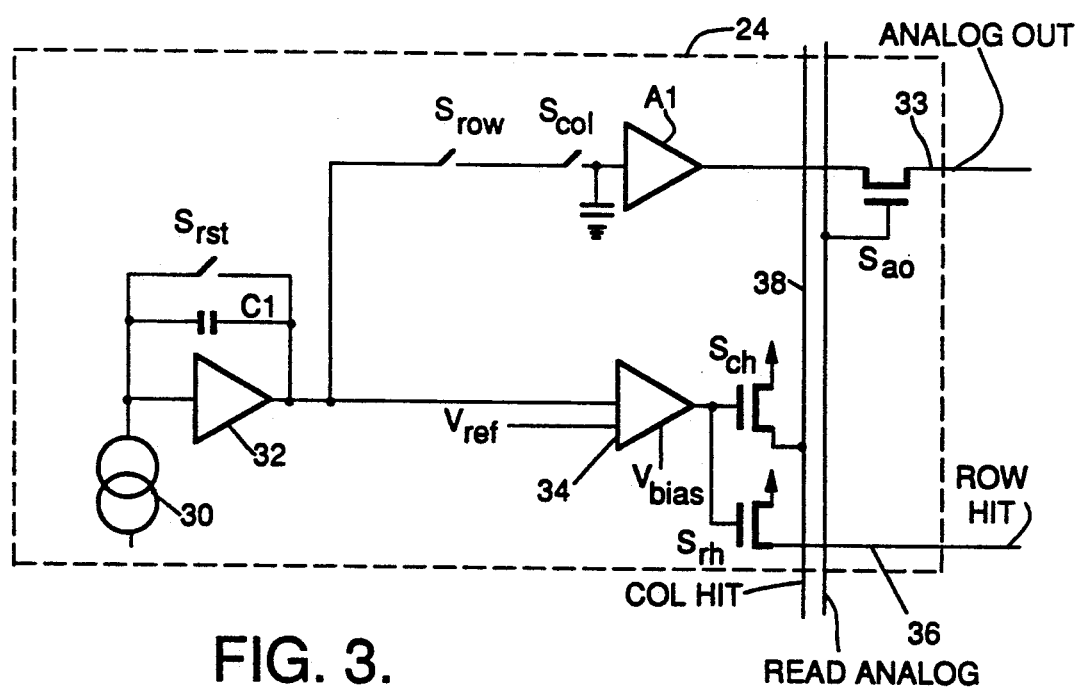
FIG. 3.

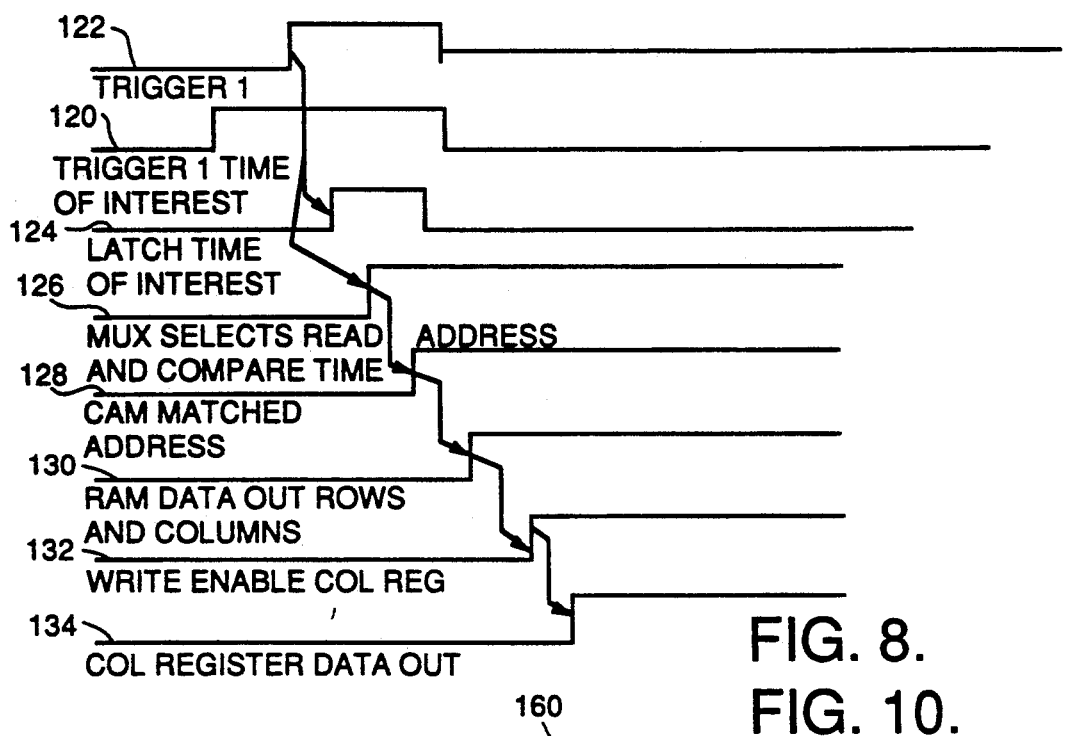
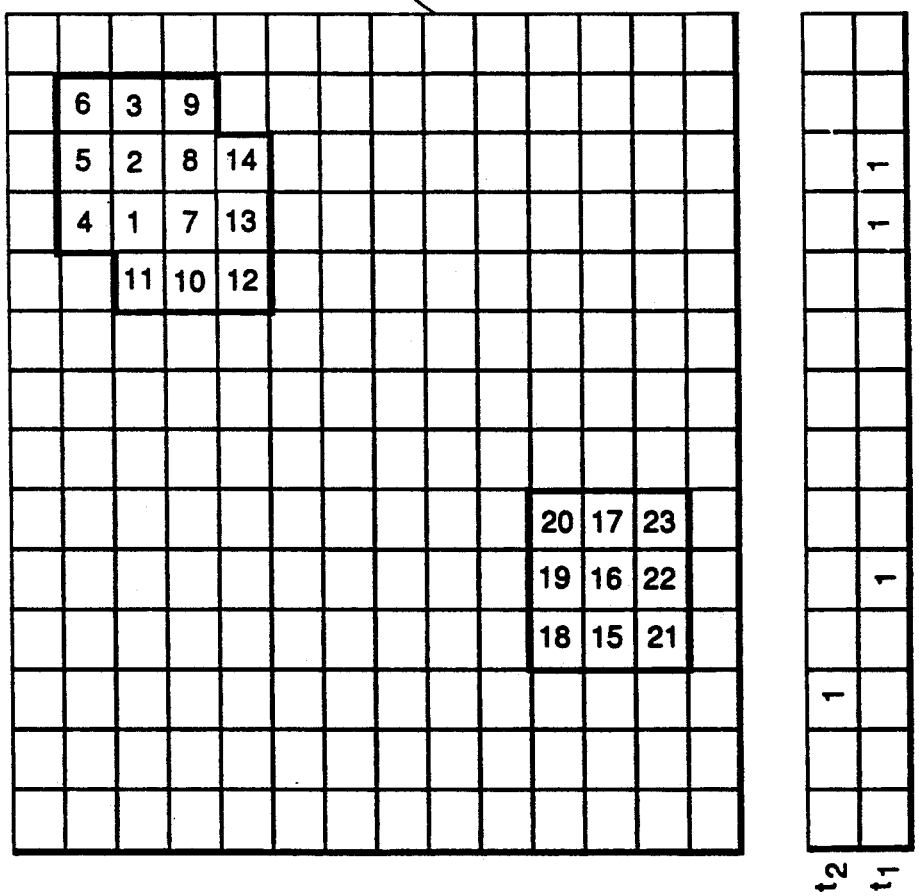
FIG. 8.
FIG. 10.

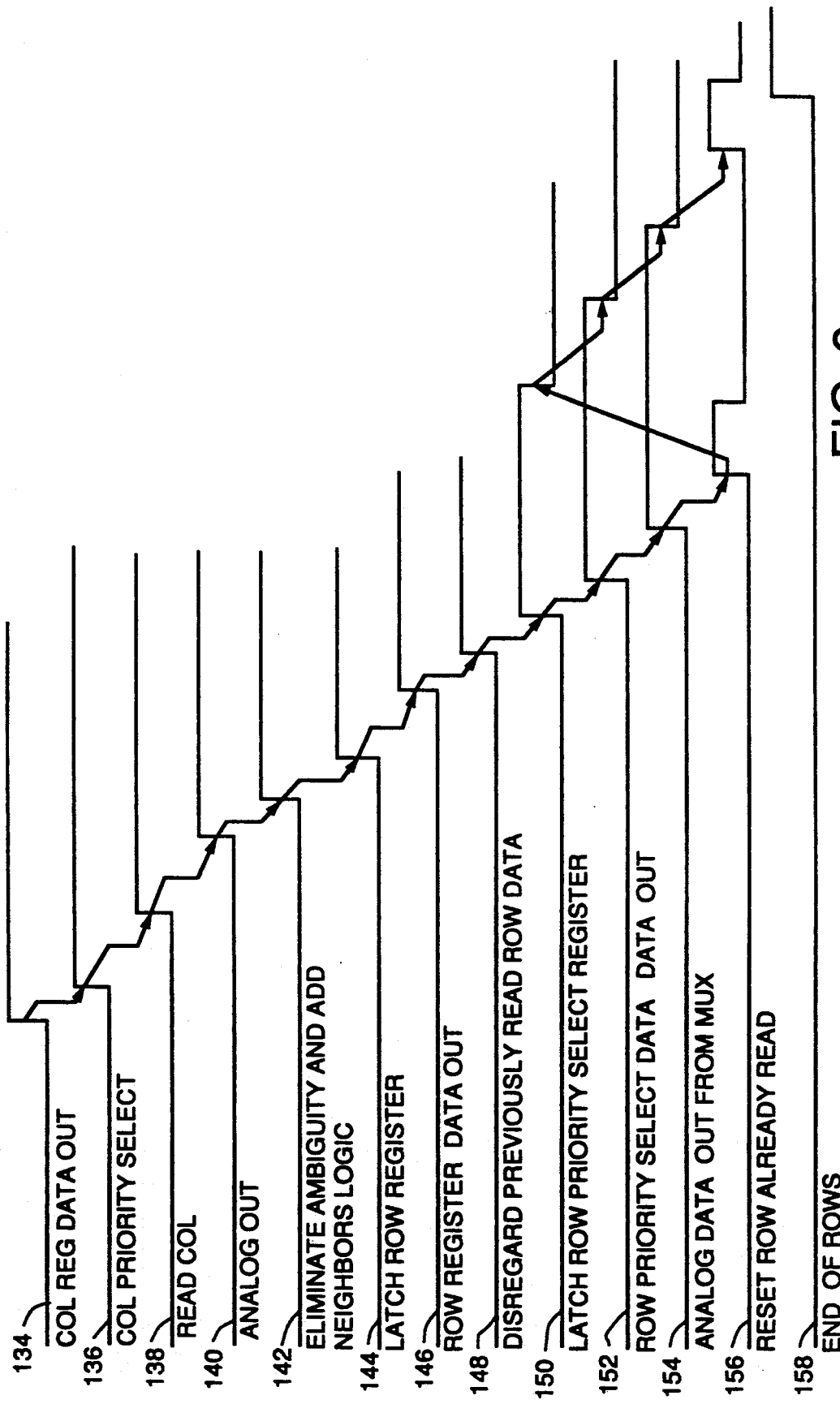

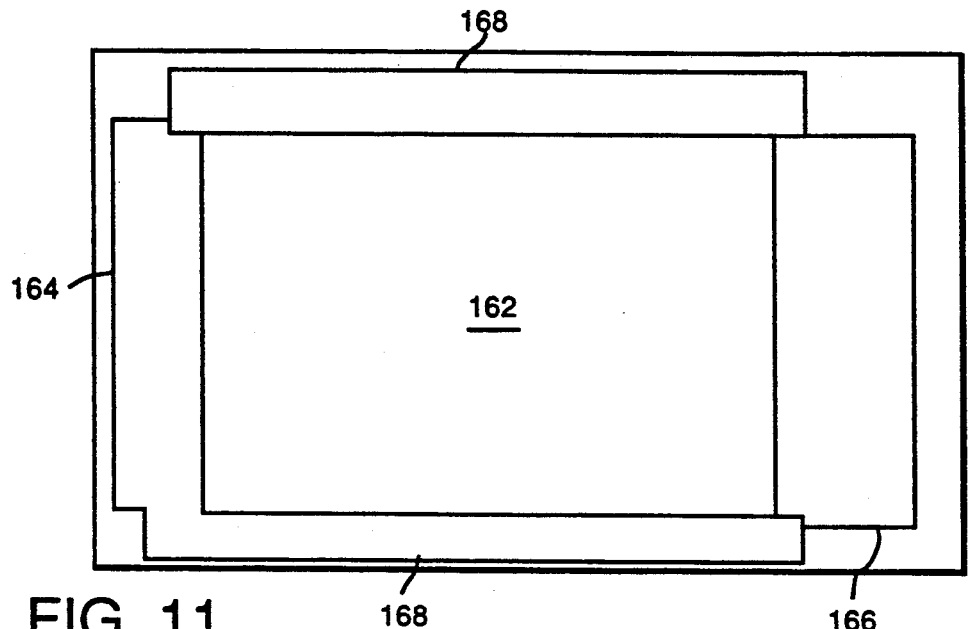
FIG. 11.
FIG. 6.
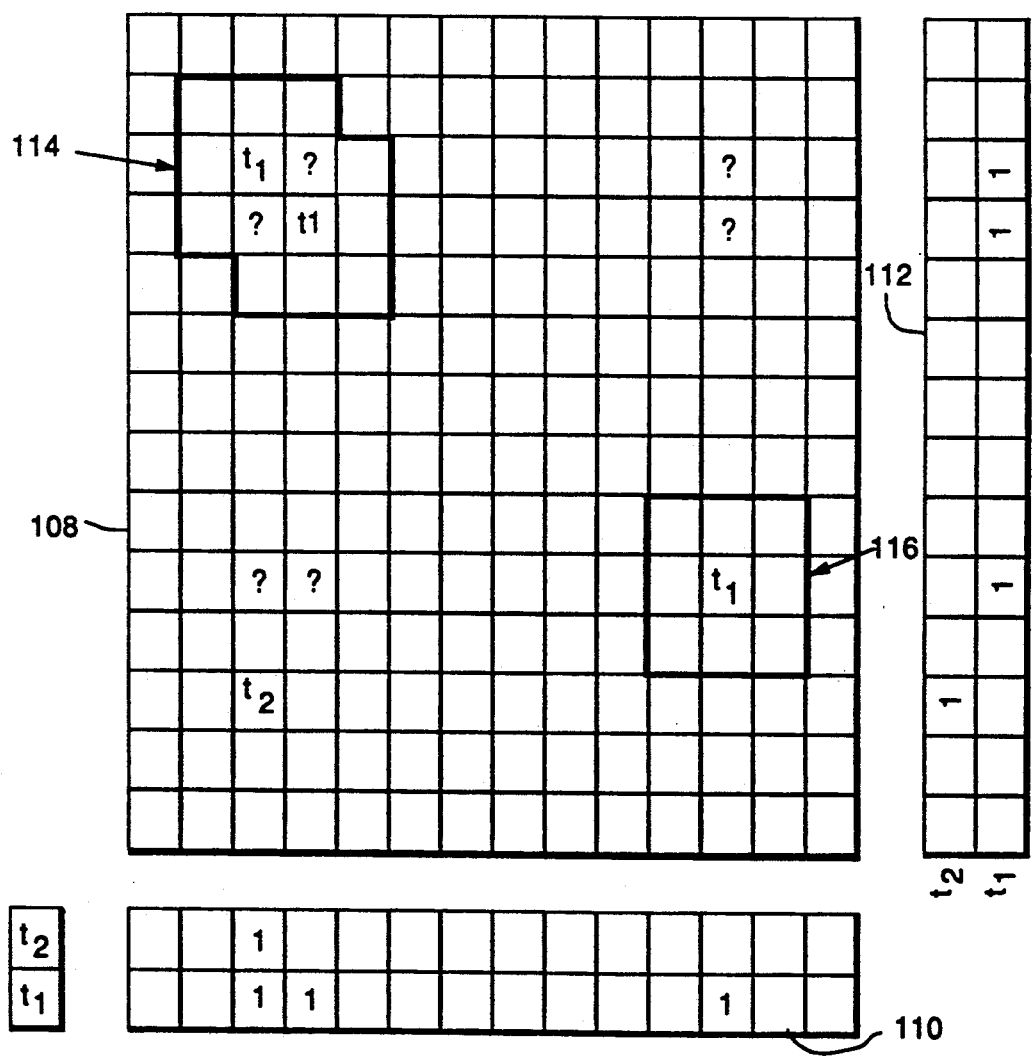

SPARSE READOUT METHOD AND APPARATUS FOR A PIXEL ARRAY

BACKGROUND OF THE INVENTION

1. Field of the Invention

This invention relates to pixel arrays used for precise detection purposes such as tracing the paths of sub-atomic particles, and to methods and systems for efficiently processing the large amounts of data resident in such arrays.

2. Description of the Related Art

There is a need for pixel detection systems capable of handling enormous amounts of data. In particular, work is currently progressing on a Superconducting Super Collider (SSC) used to generate and analyze sub-atomic particles. In the SSC, contradirected beams consisting of packets of atomic particles are collided with each other. Most of the particles pass through the other packet without encountering a collision, but some of the particles travelling in opposite directions will collide and generate sub-atomic particles. These particles in turn may disintegrate into additional particles. The locations of particle collisions are referred to as primary vertices, while the locations where sub-atomic particles generated through such collisions disintegrate into further particles are referred to as secondary vertices. The process takes place at a very fast rate, with successive particle packets arriving at the collision area at intervals of about 16 nanoseconds.

Arrays of silicon strip detectors are currently positioned in the area where collisions take place, and used in an effort to trace the vertex locations based upon the pattern of strip detectors that are hit by sub-atomic particles. However, strip detectors are fairly long devices, on the order of 1 cm, and any attempt to resolve with precision where a particle has hit them requires a large amount of computer time and power. In an attempt to limit the amount of data required to be processed, a "sparse" data processing technique has been developed that processes data only from the strip detectors that have actually been hit by sub-atomic particles, ignoring the remainder. Such an approach is discussed in Spieler, "Integrated Microsystems as a Driving Force in Modern Detector Designs", *International Conference on the Impact of Digital Microelectronics and Microprocessors on Particle Physics*, Trieste, Italy, Mar. 28-30, 1988. A silicon strip vertex detector is described in which the detector channels are automatically scanned for particle hits; information is processed only from the strip detectors that have received hits. While this significantly reduces the amount of data to be processed, the resolution is still not very high, and the requirement for continuous scanning is not well matched to the SSC environment.

A significantly higher vertex resolution could be achieved by using arrays of small scale pixels, rather than the relatively long strip detectors, to detect the sub-atomic particles traveling away from the vertices. Such a system, however, would require something on the order of $10^8$ pixels per vertex detector. Analog information describing the charges generated by the particle hits at each detector, not just digital information on whether or not a particular pixel has been hit, would be required, and it would be desirable to provide the analog data with six bit accuracy. Thus, something on the order of $6 \times 10^8$ bits of data would be generated every 16 nanoseconds, for a data rate of about $10^{16}$–$10^{17}$ bits per second. This is considerably beyond the capacity of present systems to handle.

SUMMARY OF THE INVENTION

The present invention seeks to provide a new readout method and apparatus that is capable of successfully handling a substantially higher data rate than prior systems, makes possible the use of high resolution pixel arrays in sub-atomic particle detection systems, and operates under low power and eliminates the need for noisy clock signals that are hard to distribute.

Other goals are to both reduce the amount of chip area required for the readout circuitry, and the required readout speed.

In accordance with the invention, high resolution spatial pixel arrays are used to produce a pixel signal for each pixel that has received an actuating input; in the case of a sub-atomic particle detection system, a pixel signal is produced each time a pixel has been hit by a particle. A discrimination is made between pixels that have and have not received actuating inputs, and outputs are obtained only from selected pixels. The selection of pixels is determined by the pixels which have been identified as receiving actuating inputs. The selected pixels can be limited to the actuated pixels, or can also include neighboring pixels for an even higher resolution determination of vertex locations.

Unnecessary data is further eliminated by monitoring for the occurrence of an event of interest that occurs over time substantially less frequently than the rate at which actuating inputs are supplied to the pixel array, and obtaining outputs from the selected pixels only for those times that correspond to the occurrence of an event of interest. This is accomplished by storing the locations of the actuating pixels and the times of their respective actuations in corresponding sequences, and obtaining outputs from the selected pixels by basing the selection of pixels upon the pixels that have received actuating inputs at the time of the event of interest. The actuated pixels are reset after outputs are obtained from the selected ones.

In a preferred embodiment the pixels are organized into columns and rows, and outputs are obtained from the selected pixels by sequencing through each of the columns that contain a pixel which has been actuated at the time of the current event of interest. For each such column, all of the rows that contain pixels which have been actuated since the occurrence of the previous event of interest are accessed and compared with the stored pixel row locations for the time of the current event of interest. Information is read out only from selected pixels that correspond to the accessed pixels which have received an actuating input at the time of the current event of interest.

The times when particles hit the array are stored in a memory element which has a substantially greater discrete time storage capacity than the expected number of times that particles will hit the array between successive events of interest. The memory is controlled by a counter that counts at a predetermined rate between successive events of interest, and has a substantially greater capacity than the expected time interval between successive events of interest.

The times of particles hitting the array are preferably stored in a content addressable memory (CAM) core, while the corresponding hit pixel locations are preferably stored in a random access memory (RAM) core.

The CAM core interfaces with the RAM core without intermediate encoding/decoding circuitry, and the RAM core can operate without a refresh capability.

Outputs are obtained from the column-row pixel matrix by enabling outputs to be read from the pixel columns that includes a particle hit for the time of an event of interest, on a column-by-column basis. For each such column, the pixel in each row for which a hit occurred since the time of the previous event of interest is accessed and compared with the row addresses of the pixels hit at the time of the current event of interest. Readouts are obtained only from the accessed pixels that were hit at the time of the current event of interest.

Further features and advantages of the invention will be apparent to those skilled in the art from the following detailed description, taken together with the accompanying drawings, in which:

DESCRIPTION OF THE DRAWINGS

FIG. 1 is an illustrative diagram showing the generation of sub-atomic particles in relation to the pixel detector arrays of the present invention and to separate event of interest detectors;

FIG. 2 is a simplified perspective view showing the physical arrangement of a pixel array and its associated readout circuitry;

FIG. 3 is a schematic diagram of the pixel circuitry;

FIG. 6 is an illustration of a portion of a pixel array showing potential ambiguities in the location of particle hits that are resolved by the invention;

FIG. 8 is a timing diagram illustrating the sequence for identifying the proper pixels to provide readouts;

FIG. 9 is a timing diagram illustrating the readout sequence;

FIG. 10 is a diagram of a portion of a pixel array, illustrating the sequence in which selected pixels are read; and FIG. 11 is a plan view showing the physical layout of a pixel array on a chip.

DETAILED DESCRIPTION OF THE INVENTION

Figure 4A:
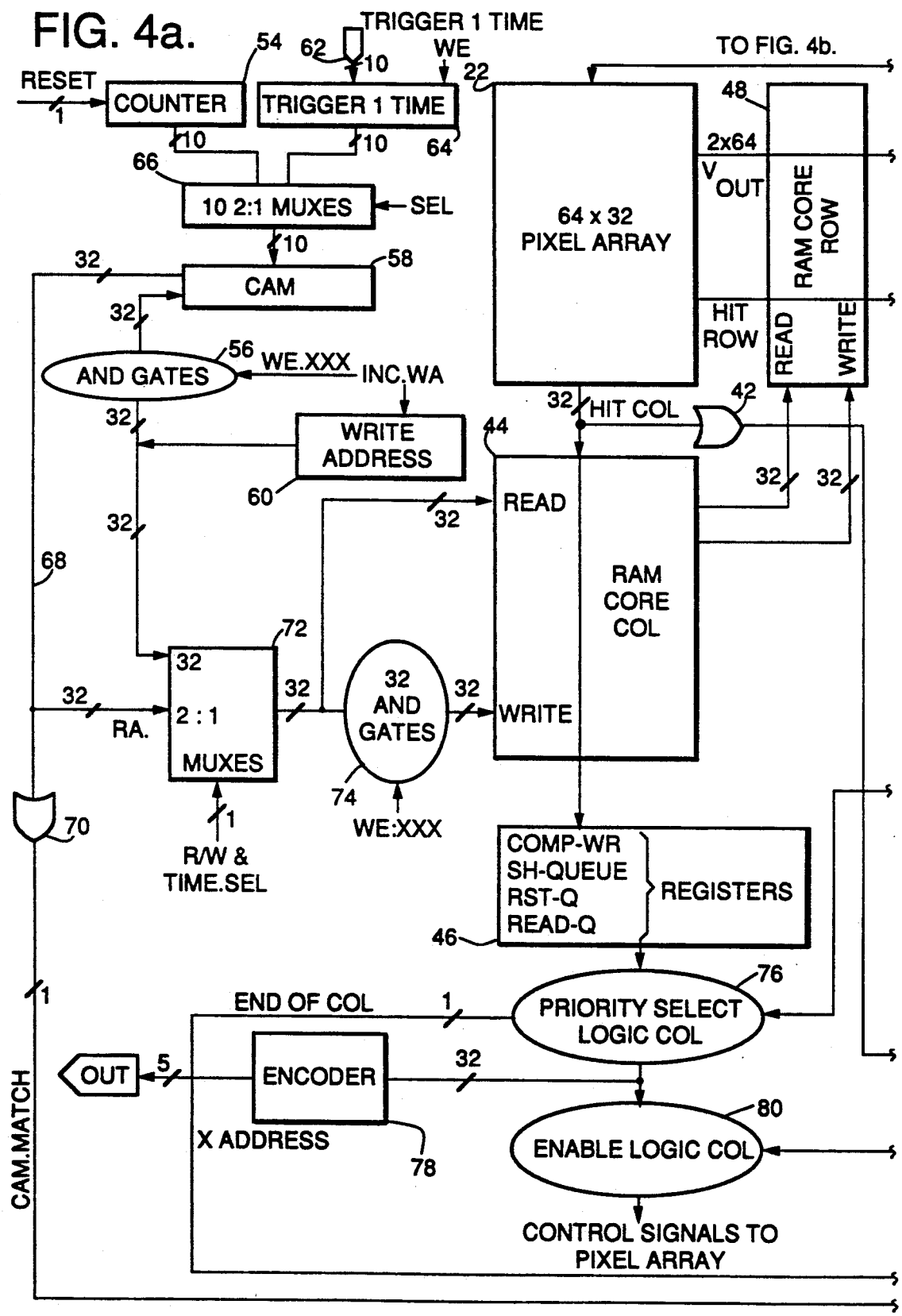
FIGS. 4a and 4b show a system diagram of the readout and control circuitry used to select pixels to be read and to obtain information therefrom.

The primary application of the present invention is in the detection of sub-atomic particles generated in a particle beam collider, and the extraction of information from the detection system in a manner that greatly reduces the data that must be processed to determine the location of particle vertices. The physical arrangement to accomplish this is illustrated schematically in FIG. 1. A pair of contra-directed particle beams 2 and 4 intersect at a vertex 6. While most of the particles in each beam will pass through the packet of particles in the other beam untouched, statistically some of the particles will collide, generating a new sub-atomic particle. The path of such a sub-atomic particle is indicated by arrow 8. At secondary vertex 10, the generated particle is shown disintegrating into 3 additional sub-atomic particles along paths 12, 14 and 16.

A large number of hybrid chips 18, each bearing a pixel array of particle detectors, are positioned around the beam axes in the vicinity of the expected collisions. The detectors are located as close to the anticipated collision site as practical, preferably about 3 cm, to accurately resolve the vertex locations based upon the locations of the particular pixels that are hit by sub-atomic particles. With a distance between a vertex and the pixel arrays of about 3 cm, vertex location resolutions of about 5 microns are achievable.

Vertex tracing is not necessary each time a particle hits a pixel array. In general, vertex locations are sought only when an external sensor has indicated that a particular event of interest has occurred. Such external sensors 20 are located substantially further away from the anticipated vertices than the pixel detector arrays 18. They may typically be calorimeters to measure particle momentum and energy, strip detectors or drift chambers. In general, only a small percentage of the particles will hit a pixel array concurrently with the occurrence of an event of interest, while the large majority of particle hits will occur at other times. The invention greatly reduces the amount of information to be processed by reading out information from the pixel arrays only on the basis of the pixels that are hit concurrently with the occurrence of an event of interest. The amount of information to be processed can be reduced by a factor on the order of 100 in this manner, on top of the $10^5$–$10^6$ reduction due to the sparse readout.

The physical implementation of a detector array is illustrated in FIG. 2. A silicon chip 22 of about 1 cm$^2$ is divided into an array of detector pixels 24; in one prototype a 32×64 array was implemented. The chip 22 was about 300 microns thick, with each pixel 24 including a PIN diode to detect a particle hit.

Readout circuitry is provided on a separate readout chip 26, which is electrically connected to each of the pixels by means of aligned in bumps 28 on the upper surface of the readout chip and the lower surface of the detector chip. The pixel detectors convert a particle hit in a conventional manner to a charge (electron-hole pair) that can then be swept off to the readout circuitry. Although separate detector and readout chips are illustrated, it would ultimately be desirable to integrate both functions in a single chip.

FIG. 3 is a schematic diagram of the pixel architecture, showing the circuitry used to record each particle hit on the pixel. The charge carriers generated by the sub-atomic particle are detected by the PIN diode detector 30, which sends a corresponding electrical signal to a preamplifier 32 that includes a feedback capacitor C1. The detector signal is proportional to the number of charge carriers generated by the particle hit. A reset switch $S_{rst}$ is connected across C1 to discharge the capacitor and reset preamplifier 32 after the analog signal stored on C1 has been transferred to a holding capacitor C2 downstream in the pixel circuitry. $S_{rst}$ can be actuated to reset the preamplifier as often as desired, prior to the commencement of particle hits, to eliminate dark current build up.

The output of preamplifier 32 is connected via switches $S_{row}$ and $S_{col}$ to holding capacitor C2, which provides the input to an amplifier A1. The output of A1 is gated by a field effect transistor (FET) switch $S_{ao}$ to provide an analog output signal from the pixel on line 33.

The output of preamplifier 32 is also connected to one input of a comparator circuit 34. The preamplifier signal is compared with a reference signal supplied to the other comparator input to determine whether the detector 30 was hit. The output of comparator 34 is connected to the gates of FET switches $S_{rh}$ and $S_{ch}$, which respectively complete circuits 36 and 38 to indicate that the row and column in which the pixel is located have received a hit.

Figure 4B:
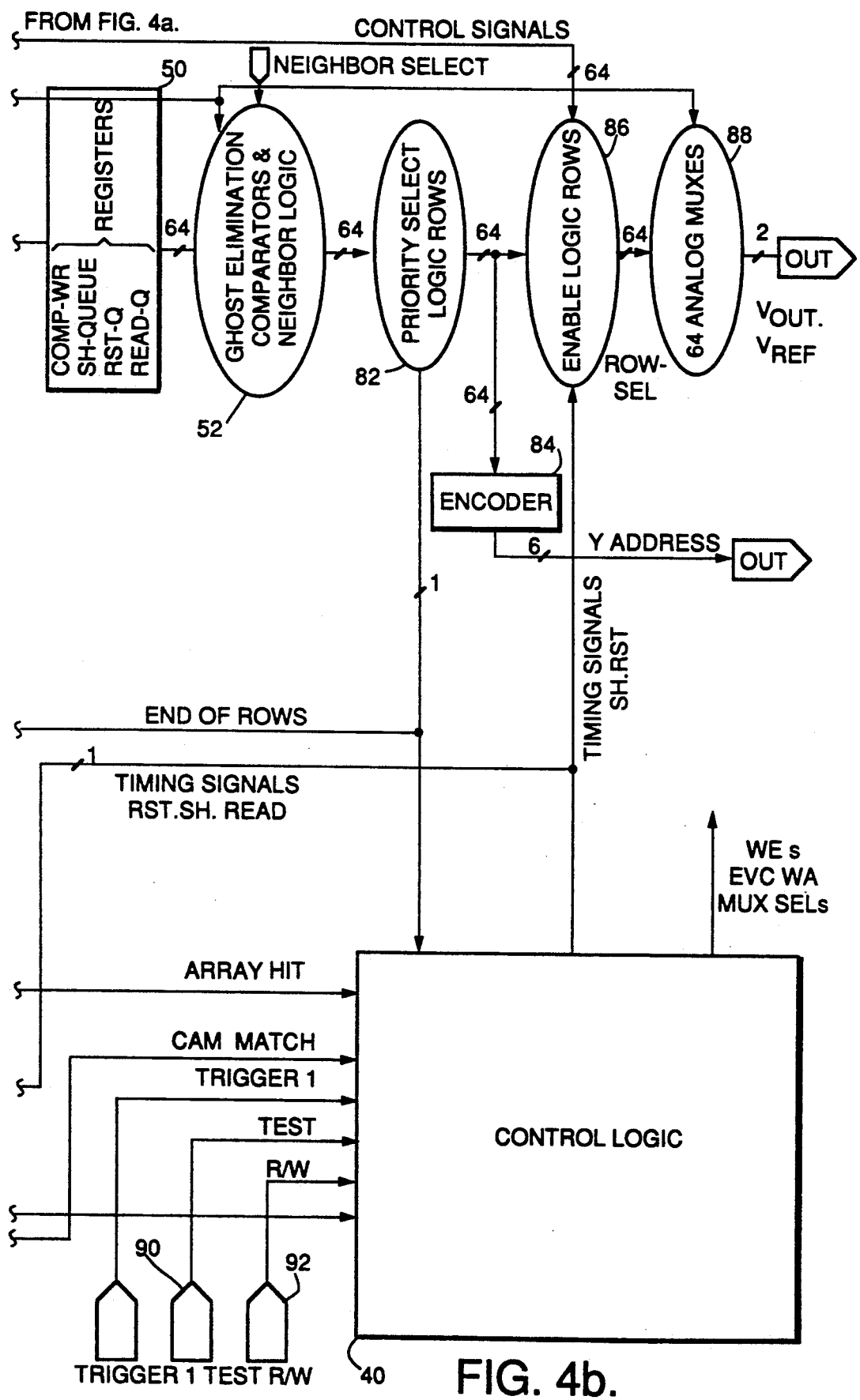

A system diagram of the pixel readout circuitry is shown in FIGS. 4a and 4b for a 64×32 pixel array 22. The pixel array does not necessarily have to be a rectangular grid of rows and columns, but this arrangement is most convenient. The designation of one pixel axis as a "row" and the orthogonal axis as a "column" is arbitrary; the row and column labels can be reversed without any change in the theory of operation. The control logic for the circuit is indicated by block 40, and includes a program ROM, counters and multiplexers to implement the logic functions described below. Once the functions themselves are known, suitable implementing logic can be designed with conventional design logic rules.

All 32 columns in the pixel array are connected as inputs to an OR gate 42, which provides an indication of when the array has been hit to the control logic. In response, the control logic initiates the various information storage and readout procedures described below. The identity of the hit column is also stored in a column RAM core 44, and in various registers 46 that include a work register for the pixel comparators, a sample and hold register for the signal stored on capacitor C2 within the pixels, a reset queue that controls which pixels are reset, and a read queue that controls which pixels are read out. In a similar manner, the pixel rows in which hits occur are read into a row RAM core 48 and a series of row registers 50. The column and row information is read into successive lines of their respective RAMs in the sequence in which the hits occur. Row information from the pixel array 22 is also delivered to a "ghost elimination and neighbor logic" block 52.

Although the pixel comparators 34 indicate the pixel positions that have been hit, readouts from the RAMs are obtained only upon the occurrence of an event of interest as indicated by the external detectors 20. In between such events of interest, the column and row locations of numerous hits will normally accumulate in the column and row RAMs 44, 48. Thus, if a particular row and/or column has been hit more than once between successive events of interest, there can be an ambiguity in determining the exact row and column location of the pixel hit that occurred concurrently with the event of interest. The ghost elimination comparators eliminate this ambiguity, as explained in further detail below. The "neighbor select" option enables a readout not only from the pixels that are hit at the time of an event of interest, but also from the pixels that neighbor the hit pixels. Since the neighboring pixels may carry an unbalanced pattern of charge if the hit pixel was hit off-center, reading out the neighboring pixels along with the hit pixel can provide a finer resolution for vertex detection.

If it is assumed that a beam crossing will occur every 16 nsec, a counter 54 that establishes an operating rate for the system is set to count at a 16 nsec rate. When a pixel has been hit, the control logic 40 provides a write enable signal to a series of AND gates 56 associated with each row in the array. This enables the time of the hit, as determined by counter 54, to be read into a content addressable memory (CAM) core 58, with a write address logic block 60 incrementing the position of each successive time count applied to CAM 58. When one of the external sensors 20 (FIG. 1) has indicated the occurrence of an event of interest, a signal is applied to input terminal 62 to record the time of the event in register 64. The counter 54 and register 64 are connected to CAM 58 through a series of multiplexers 66. When an event of interest has occurred, the time of the "TRIGGER 1" signal is compared with the counter times stored in CAM 58. If the TRIGGER 1 time matches one of the stored counter times, indicating that there has been at least one pixel hit during the TRIGGER 1 time, a "CAM-match" signal is applied over line 68 and OR gate 70 back to the control logic 40; OR gate 70 allows the CAM-match signal to be sent when a match is established between the TRIGGER 1 time and any of the counter times that have been entered into the CAM.

The capacity of CAM 58 is substantially larger than the expected number of pixel hits that will occur between successive events of interest. The excess capacity assures that the CAM does not overflow in case the pixel hits occur faster than expected. For example, if an average of 20 pixel hits is expected between successive events of interest, CAM 58 may be provided with a storage capacity of 32 separate lines.

The bit capacity of counter 54 is designed to be between successive TRIGGER 1 signals. The excess counter capacity assures that the counter will not cycle all the way through and then start counting over again, possibly placing the same time count on more than one CAM line, in case the pixel hits occur more slowly than expected.

The write address 60 is incremented after each entry into CAM 58. When a word match has been established between CAM 58 and the TRIGGER 1 signal, the corresponding address information is read out from the column RAM core 44 via multiplexers 72; AND gates 74 allow the information to be written into RAM 44 upon receipt of a write enable system from the control logic.

A priority select logic block 76 controls the order in which column information is read out. This logic selects one hit column at a time in a predetermined order, such as from left to right. Its output is sent to a column address encoder 78, and to an enable logic block 80 for the columns that delivers control signals to reset the pixel array columns.

As described further below, each hit column (and its neighboring columns) is enabled in turn, and all of the rows are enabled for each column. The order of row readout is controlled by a row priority select logic block 82, which provides row address signals through encoder 84 and controls the row enable logic block 86. The ultimate output data is provided from analog multiplexers 88, which are fed by the row select signals and the analog hit signals stored in the selected pixels.

Another feature of the pixel detector architecture is a test mode, entered in response to a signal on test input terminal 90. The test mode is used to determine when pixels are malfunctioning, so they can be eliminated from being read. Also, the system includes the option of reading and writing in parallel, actuated by a signal applied to r/w terminal 92. This option increases the speed of operation, at the cost of some additional noise.

Figures 5, 7:
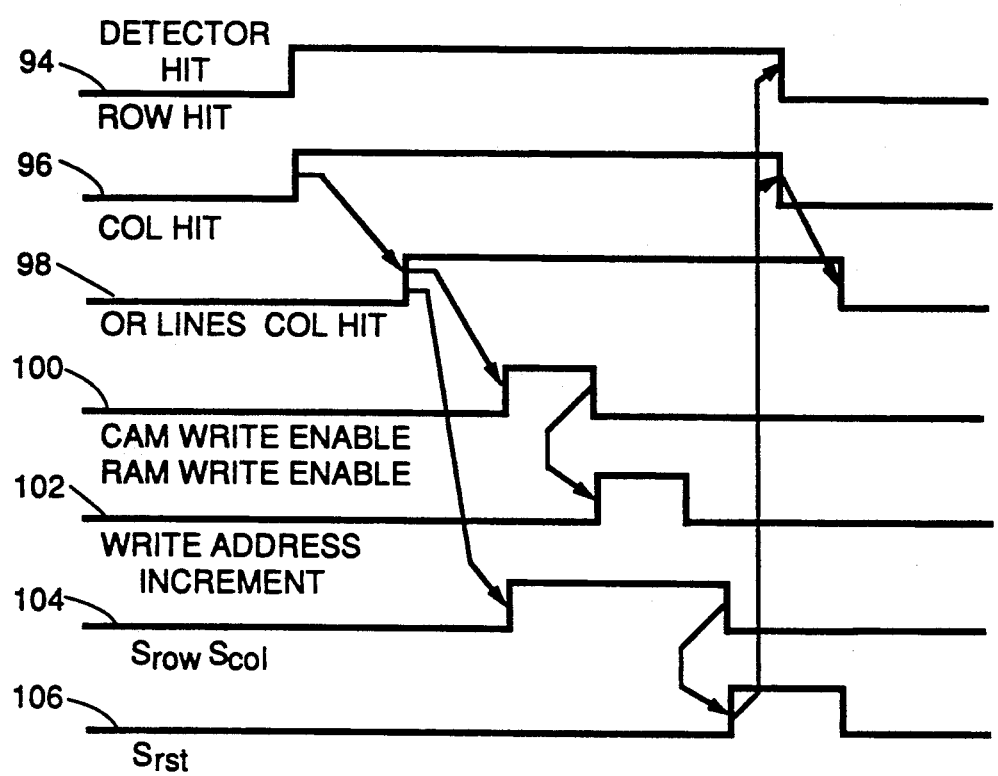
FIG. 5 is a timing diagram illustrating the sequence by which times are assigned to each particle hit.
FIG. 7 is a diagram of a portion of a pixel array illustrating the concept of obtaining readouts from neighboring pixels as well as from a pixel that has been hit by a sub-atomic particle.

FIG. 5 is a timing diagram showing the sequence for registering the time of a pixel hit ("time stamping") and storing the analog hit data in the pixel. Initially, the pixel array is quiescent and waiting for hits. During this time the switch $S_{rst}$ (FIG. 3) is cycled on and off as often as desired to eliminate dark current buildup. The CAM and RAM write addresses are initialized to 000 ... 1.

Assume now that one of the pixels in the detector is hit by a sub-atomic particle. The comparators 34 for the hit column and row are triggered, causing the row hit and column hit lines to go high (traces 94, 96). The OR gate 42 which is fed from all of the column hit lines thus goes high (trace 98), activating the write enable lines for the CAM and RAM cores (trace 100). The write enable lines stay on for the time required to write the row and column address information to the RAM and CAM. At the end of the write period, the data written to the memory address 000 ... 1 increments the write address to the next memory addresses (trace 102).

The signal that a column has been hit also initiates a single pulse that is sent to all $S_{row}$ and $S_{col}$ lines that were hit, including their neighboring rows and columns if the neighbor select option is used. This pulses the $S_{row}$ and $S_{col}$ switches of the selected pixels, so that the analog charge data for those pixels is stored in their respective holding capacitors C2 (trace 104). At the same time, a single pulse is sent on the $S_{row}$ and $S_{col}$ lines to reset the analog storage in each pixel corresponding to the x,y coordinates stored in the next write address of the RAM, to eliminate the buildup of old data.

The control logic then sends reset signals to reset the pre-amplifier $S_{rst}$ switches on the hit columns (trace 106). This causes the comparators 34, as well as the row hit and col hit lines to go low, resetting the pixel so that future hits on the same columns and rows can be registered.

FIG. 6 is an illustration of a pixel hit pattern. The pixel array is indicated by numeral 108, while the rows and columns at which hits occur at two different times $t_1$ and $t_2$ are indicated by matrices 110 and 112. Assume that three pixels are hit at time $t_1$, and one pixel is hit at time $t_2$, in the locations indicated by the row and column hit matrices. The hit pixels are indicated by the times of the hit in the pixel array 108. When the neighbor select option is used, readouts are obtained not only from the hit pixels, but from their immediate neighbors which share a common border with the hit pixels. The selected pixels for time $t_1$ including both the hit pixels and their neighbors, are enclosed in envelopes 114 and 116.

An ambiguity can develop in identifying the hit pixels when more than one pixel is hit during a particular TRIGGER 1 time period. It will be recalled from the description of FIG. 3 that, when a particular pixel is hit, its comparator 34 turns on the hit lines for the entire column and row in which the pixel is located. Thus, when more than one pixel is hit in a given time period, there can be an uncertainty in matching up each hit row with its corresponding hit column. For example, when there are three hits at time $t_1$ as in FIG. 6, for any given hit column it is uncertain which of the three hit rows apply. The false hit locations that would still satisfy the row and column hit information, referred to as "ghost" locations, are indicated by question marks in FIG. 6. This ambiguity is resolved in the readout process by enabling only one column at a time, and reading out only from the hit row for the enabled column (plus its neighbors, if desired). Ghost hit locations are thus eliminated.

The rationale for obtaining outputs from neighboring pixels as well as from a hit pixel is illustrated in FIG. 7.

Assume pixel 118 has been hit, and is storing a charge value of 100. If the location of the hit on the pixel was off-center, the neighboring pixels may also store some charge of lesser amounts, with the neighbors closer to the hit location storing more charge than those further away. Possible charges on neighboring pixels for a particle hit at location x on pixel 118 are indicated in FIG. 7. Analyzing the charges on these neighboring pixels can assist in resolving the exact hit location.

During the write mode, the pixel array is being hit randomly by sub-atomic particles. Each hit's location and the time of hit are registered as described above. Analog data recording the charge generated by the hit is stored in a storage buffer (capacitor C2) in each pixel after a hit, allowing the pre-amplifier stage of the pixels to be reset to eliminate dark current leakage buildup.

The read mode starts with an external TRIGGER 1 signal, indicating that an event of interest has occurred. The logic determines the time of interest corresponding to the TRIGGER 1 signal, and searches for the row and column locations of pixels that were hit during this time. The analog data in the hit pixel locations (and their neighbors if desired) are read out using a multiplexer, and the corresponding x and y addresses are also sent out on the address buses. The locations that were not hit at the time of interest are not read out, introducing a savings of up to about 2,000 times in the amount of data to be processed per chip read (most of the chips will not be hit, and therefore will not be read).

FIG. 8 shows a typical sequence used to identify the TRIGGER 1 time of interest, and the corresponding row and column information to be read out. The occurrence of an event of interest is indicated by trace 122, with the TRIGGER 1 time of interest signal shown on trace 120. The time of interest is latched in latch 64 (FIG. 4a, trace 124), and multiplexer 66 selects the time in register 64 to be compared with the times recorded in CAM 58 (trace 126). If a match is established between the TRIGGER 1 counter time and one of the CAM addresses (trace 128), the matched CAM address is used to enable the corresponding one of the 32 addresses from the column and row RAM into the work registers (trace 130). A write enable signal is sent to the column register (trace 132), followed by the outputting of data from the column register to identify the columns that were hit at the time of interest (trace 134).

The readout sequence after the time of interest has been determined is summarized in FIG. 9. The columns that were hit at the time of interest, and their neighboring columns, have been read out from the column register (trace 134). This initiates the column priority select logic (trace 136), which determines the order in which the selected columns are to be read out. A read signal is sent to the first selected hit column (trace 138), and the analog signal stored in the holding capacitor C2 for each of the selected hit and neighboring rows in the selected column is read out through switches $S_{ao}$ (FIG. 3) to the analog multiplexers 88 (trace 140). All rows on a given column are enabled for an analog output at the same time, time is not wasted to charge the analog out row lines for each pixel read. The logic for eliminating ambiguity and adding neighboring pixels is also entered, if desired, when the analog out lines are enabled (trace 142).

At this time, the first column to be read has been identified, and the analog out lines for that column have been enabled. The row register is latched with the rows for the column presently being processed (trace 144).

The row register data is outputted (trace 146) and applied to respective AND gates for each row. The other inputs to the AND gates are supplied by comparators in the ghost elimination circuitry 52, which indicate whether or not a particular pixel was hit. The result of the AND process is an identification of the rows that were hit (and their neighbors, if desired) within the column under consideration. If the row data has already been read for a previous column, it is disregarded (trace 148). The row priority select register is then latched to establish the sequence in which the selected rows for the column under consideration will be read (trace 150), and the row priority select data is used to read out the analog data for the first selected row from multiplexer 88 (traces 152 and 154). The row is then reset (trace 156), and the analog data from the remaining selected rows for the column in question are then read out in the sequence determined by the priority select register, repeating the trace 150–156 pattern for each successive row.

When the last selected row of the first column has been read out, and end of rows signal 158 is generated and supplied to the column priority select logic 76 (FIG. 4a). This returns the system to trace 136, in which the column priority select function selects the next column that has registered a hit at the time of the event of interest (or its neighbors). All of the rows for the next column are enabled, and the selected rows are read out in a similar fashion. When readout from the last selected column has been completed, the column priority select logic 76 sends a signal to the control logic indicating the same. The system then returns to its original state, and again begins to register the times of pixel hits until the next TRIGGER 1 signal appears.

The preferred sequence for reading pixels selected during a time of interest $t_1$ is illustrated in FIG. 10. Assume that the same pixels were hit as in FIG. 6. The leftmost column 160 containing a hit is first selected, and readouts are obtained from the hit pixel and its neighbors in the rows immediately above and below. The neighboring pixels in the columns to the left and right of the hit pixel are then read. If the same column is accessed for more than one hit pixel, common rows are read only the first time the column is accessed. This is accomplished by adding a "1" to a work register each time a row is read to keep track of the rows already read for a particular column.

One of the advantages of the invention is that only memory cores are required for the RAM and CAM, without encoding circuitry for the CAM, decoding circuitry for the RAM, or a refresh capability for the RAM. The need for encoding and decoding circuitry is eliminated because the CAM core output is connected directly to the RAM core input. Events of interest that will trigger a pixel readout in a sub-atomic particle detection system typically occur at intervals of not more than 2 microseconds, whereas the typical dynamic RAM refresh period is about 1 millisecond. Since the dynamic RAM used for the invention is reset much more frequently in operation, there is no need to refresh it. The elimination of encoding, decoding and refresh circuitry significantly increases the proportion of the chip that can be devoted to the pixel array, since the RAM and CAM cores can be quite small.

FIG. 11 shows in outline form the physical configuration of a chip that bears a pixel array in accordance with the invention. The 32×64 array is in area 162. Areas 164 and 166 are devoted respectively to internal analog circuitry and analog data output circuitry, while areas 168 are used for digital registers.

The invention thus provides a way to greatly reduce the amount of data required to be processed in a sub-atomic particle detector system, without losing any information that is truly of interest. While an illustrative embodiment of the invention has been shown and described, numerous variations and alternate embodiments will occur to those skilled in the art. Such variations and alternate embodiments are contemplated, and can be made without departing from the spirit and scope of the invention as defined in the appended claims.

We claim:

1. A method for obtaining information from the pixels of a spatial pixel array that have received an actuating input, comprising:
   producing a pixel signal for each pixel that has received an actuating input,
   discriminating between pixels that have and have not received actuating inputs, and
   obtaining outputs only from selected pixels that are determined by the pixels that have been identified as receiving actuating inputs.

2. The method of claim 1, further comprising the steps of monitoring for the occurrence of an event of interest that occurs over time substantially less frequently than the rate at which actuating inputs are supplied to said pixel array, and obtaining outputs from said selected pixels only for times that correspond to the occurrence of an event of interest.

3. The method of claim 2, wherein the actuated pixels store signals corresponding to their respective inputs until outputs are obtained from the selected pixels, and the actuated pixels are then reset.

4. The method of claim 2, wherein the locations of the actuated pixels and the times of their respective actuations are stored in corresponding sequences, and outputs are obtained from said selected pixels by selecting said pixels based upon the pixels that receive actuating inputs at the time of the event of interest.

5. The method of claim 4, wherein said pixels are organized into columns and rows, and outputs are obtained from said selected pixels by sequencing through the columns that contain a pixel which has been actuated at the time of the current event of interest, for each such column accessing the rows that contain pixels which have been actuated since the occurrence of the previous event of interest, comparing the accessed rows with the stored pixel row locations for the time of the current event of interest, and reading out information only from the selected pixels which correspond to the accessed pixels that have received an actuating input at the time of the current event of interest.

6. The method of claim 1, wherein said pixels produce pixel signals in response to being hit by sub-atomic particles.

7. The method of claim 6, wherein said selected pixels comprise pixels which are hit by a sub-atomic particle, and pixels which are neighbors to said hit pixels.

8. A method of reading out information from an array of pixels that are actuated when they are hit by sub-atomic particles, comprising:
   producing a pixel signal for each pixel that has been hit above a predetermined threshold by a sub-atomic particle,
   discriminating between pixels that have and have not been hit above said threshold, monitoring for the occurrence of an event of interest that occurs over time substantially less frequently than the rate at which pixels are hit, and obtaining outputs only from selected pixels that are determined by the pixels that are hit at the time of an event of interest.

9. The method of claim 8, wherein said selected pixels comprise pixels which are hit by sub-atomic particle above said threshold, and pixels which are neighbors to said hit pixels.

10. A system for obtaining information from the pixels of a spatial pixel array that have received an actuating input, said pixels including detectors that are responsive to actuating inputs to produce pixel signals that correspond to their actuating inputs, comprising:

means for discriminating between pixels that have and have not received actuating inputs, and means for obtaining outputs only from selected pixels that are determined by the pixels that have been identified as having received actuating inputs.

11. The system of claim 10, for use with an array of pixels that are responsive to being hit by sub-atomic particles, said detectors producing output signals when they are hit by sub-atomic particles above a predetermined threshold.

12. The system of claim 11, further including means separate from said pixel array for determining when events of interest have occurred, said events of interest occurring over time substantially less frequently than the rate at which sub-atomic particles hit the detector array, said means for obtaining outputs from said selected pixels being operable to obtain said outputs only for times corresponding to the occurrence of events of interest.

13. The system of claim 12, said discriminating means including means for storing the times that particles hit said array, said means for obtaining outputs only for a stored time that corresponds to the time of an event of interest.

14. The system of claim 13, said means for storing the times of particles hitting the array having a substantially greater discrete time storage capacity than the expected number of times that particles will hit the array between successive events of interest.

15. The system of claim 14, further comprising means for resetting said time storage means after the occurrence of an event of interest.

16. The system of claim 13, said means for storing the times of particles hitting the array being controlled by a counter that counts at a predetermined rate between successive events of interest, said counter having a substantially greater capacity than the expected time interval between successive events of interest.

17. The system of claim 13, wherein said means for storing the times of particles hitting the array comprises a content addressable memory (CAM) core, and further comprising a random access memory (RAM) core for storing the corresponding hit pixel locations, said CAM core interfacing with said RAM core without intermediate encoding/decoding circuitry, and said RAM core operating without a refresh capability.

18. The system of claim 13, said pixel array being organized in a matrix of columns and rows, wherein outputs are obtained only from the columns and rows for the selected pixels at the stored times of said events of interest.

19. The system of claim 18, further comprising means for storing the row and column address of each hit pixel in a sequence corresponding to the sequence in which the times of particles hitting the array are stored.

20. The system of claim 19, said pixels including means for storing the signals from their respective detectors, and further comprising means responsive to the array being hit for enabling the hit pixel to store the signal from its detector.

21. The system of claim 20, said means for obtaining outputs from said selected pixels comprising means for enabling outputs to be read from the pixel columns that include a hit for the time of an event of interest on a column-by-column basis, and means for reading out the signals stored in the rows of each such column for which a hit occurred at the time of an event of interest.

22. The system of claim 21, said means for reading out the signals stored in the rows comprising means for accessing the pixels in each row for which a hit occurred since the time of the previous event of interest, means for comparing the accessed pixels with the row addresses of the pixels hit at the time of the current event of interest, and means for reading out only the accessed pixels that were hit at the time of the current event of interest.

23. The system of claim 21, further comprising means for resetting each column when it has been read out.

24. The system of claim 21, said means for obtaining outputs from said selected pixels comprising means for reading out the signals stored in the rows of each column which border a row in which a hit occurred at the time of the event of interest, as well as from the row in which the hit occurred.

25. The system of claim 11, wherein said selected pixels comprise pixels for which a hit by a sub-atomic particle has been detected, and their neighboring pixels.

* * * * *